UNITED STATES PATENT OFFICE.

AUGUST KOY, OF PETERS, TEXAS.

METHOD OF PROTECTING VEGETABLE MATTER.

No. 857,075.      Specification of Letters Patent.      Patented June 18, 1907.

Application filed April 25, 1906. Serial No. 313,655.

*To all whom it may concern:*

Be it known that I, AUGUST KOY, a citizen of the United States, residing at Peters, in the county of Austin and State of Texas, have invented a new and useful Method of Protecting Vegetable Matter, of which the following is a specification.

My present invention relates to the protection of stored vegetable matter, particularly corn, from the ravages of insects, especially the weevil, and the object is to provide an effective method capable of being practiced during the storing of the corn or other vegetable matter, and serving to insure the complete protection thereof against the weevil or other insects for an indefinite period.

As the result of a series of experiments, I find that wood ashes and salt, when associated with corn or other vegetable matter, will render the latter immune from the attack of insects. I have therefore devised a novel method whereby ashes and salt may be associated with the corn or other vegetable matter as it is stored, in order to insure its subsequent protection.

In practicing the method, I cover the floor upon which the corn or the like is to be stored with a thin layer of wood ashes. A layer one-sixteenth of an inch in depth is sufficient, and by preference, the ashes used are those produced by the combustion of oak or other hard wood. Upon this layer of ashes corn in the husk is piled to a depth of say one foot. Over this layer of corn, wood ashes is sprinkled, the quantity employed being approximately one peck to each fifty square feet of floor surface. Over this layer of ashes is sprinkled a solution of salt produced by approximately twenty pounds of common salt in approximately 8 gallons of water. Other layers of corn similar to the one described are then piled on the first layer, and each layer is strewn with ashes and sprinkled with the salt solution or brine, as described. It should be understood, however, that the proportions stated are not invariable, and that while the invention is directed more particularly to the protection of stored corn from the ravages of the weevil, the invention is thought to reside broadly in the protection of stored vegetable matter by the association therewith of wood ashes and brine.

What I claim is:—

1. That method of protecting vegetable matter which consists in storing the same upon a layer of wood ashes and scattering wood ashes over the vegetables so stored and in thereafter sprinkling the ash covered vegetables with a solution of salt.

2. That method of protecting corn from the ravages of the weevil which consists in covering the floor of the crib with a layer of wood ashes, next placing a layer of corn in the husk upon the layer of wood ashes, next scattering a quantity of wood ashes over the layer of corn, next sprinkling the layer of corn with a solution of salt, and thereafter adding additional layers of corn, one at a time, and applying wood ashes and a solution of salt to each layer in the manner stated.

In testimony, that I claim the foregoing as my own, I have hereto affixed my signature in the presence of two witnesses.

his
                       AUGUST ✕ KOY
                            mark.

Witnesses:
     A. S. HOLLEY,
     C. E. HILLBOLDT.